No. 613,690. Patented Nov. 8, 1898.
C. F. & P. F. LEWIS.
SELF MEASURING TANK FOR LIQUIDS.
(Application filed Sept. 17, 1897.)
(No Model.) 2 Sheets—Sheet 1.
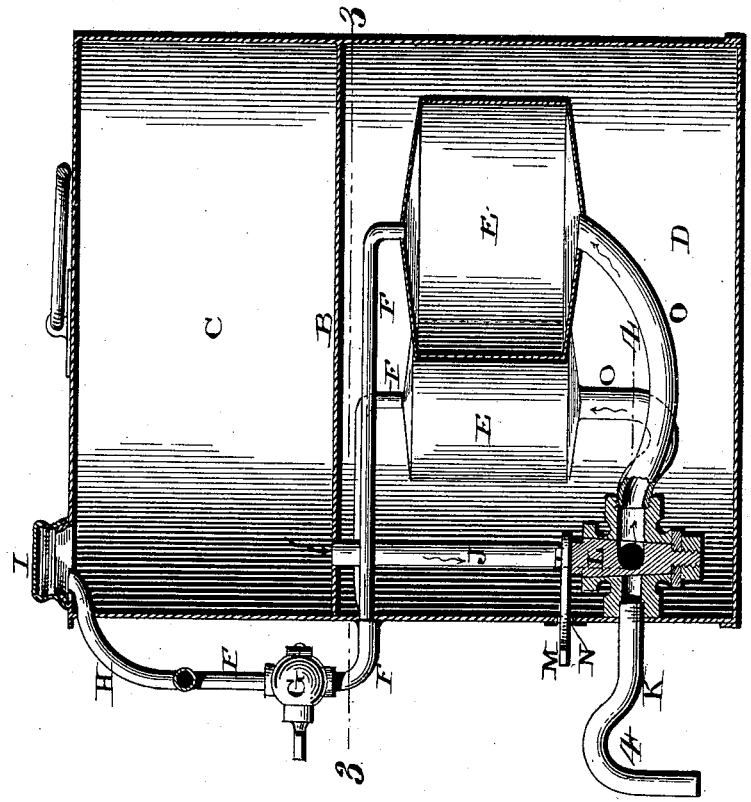
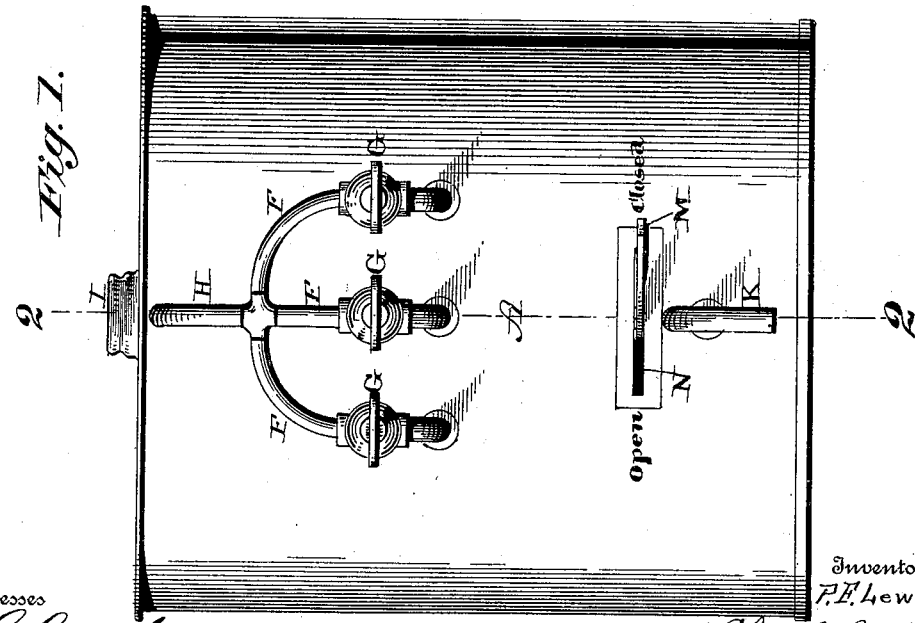

No. 613,690. Patented Nov. 8, 1898.
C. F. & P. F. LEWIS.
SELF MEASURING TANK FOR LIQUIDS.
(Application filed Sept. 17, 1897.)
(No Model.) 2 Sheets—Sheet 2.
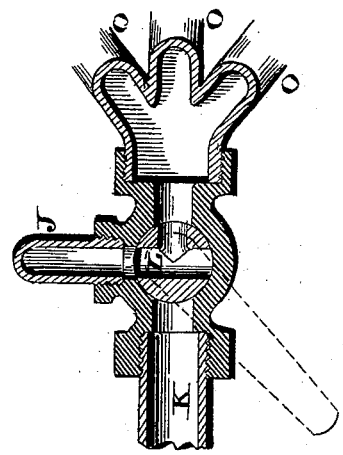
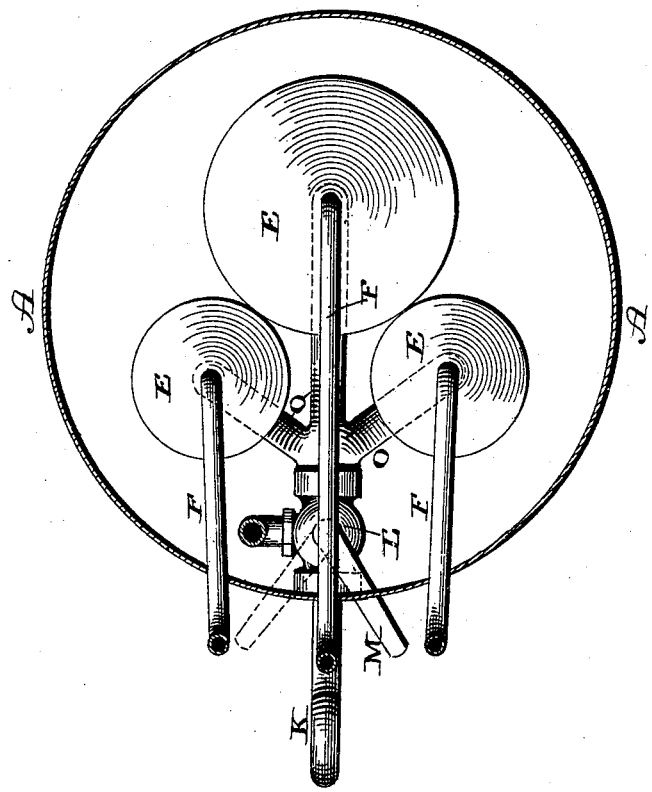
Witnesses
L. C. Hills
J. M. Pfeiffer
Inventors
P. F. Lewis and
Chas. F. Lewis,
by Franklin H. Hough
Attorney
THE NORRIS PETERS CO., PHOTO-LITHO., WASHINGTON, D. C.

UNITED STATES PATENT OFFICE.

CHARLES F. LEWIS AND PERRIN F. LEWIS, OF JAMESTOWN, NEW YORK.

SELF-MEASURING TANK FOR LIQUIDS.

SPECIFICATION forming part of Letters Patent No. 613,690, dated November 8, 1898.

Application filed September 17, 1897. Serial No. 652,055. (No model.)

*To all whom it may concern:*

Be it known that we, CHARLES F. LEWIS and PERRIN F. LEWIS, citizens of the United States, residing at Jamestown, in the county of Chautauqua and State of New York, have invented certain new and useful Improvements in Self-Measuring Tanks for Liquids; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in measuring oil-tanks; and it consists in a suitable inclosing case, which is divided by a horizontal partition into the tank for holding the oil and the space in which the measuring vessels are placed, combined with the measuring vessels, air-pipes extending from the top thereof, bent pipes which form air-traps extending from the bottoms, a supply-pipe, and a three-way cock, which is placed in the delivery-pipe, as will be more fully hereinafter described.

The objects of our invention are to produce a measuring-tank from which any desired quantity of oil can be drawn by operating the lever attached to the cock and to so construct the delivery-pipes extending from the measuring vessels that they form air-traps, and thus prevent the liquid from discharging from any of the measuring vessels excepting the one which is supplied with air by opening the air-cock in the pipe connected to it.

The invention is clearly illustrated in the accompanying drawings, which, with the letters of reference marked thereon, form a part of this specification, and in which drawings—

Figure 1 is a side view of an oil-tank complete embodying our invention. Fig. 2 is a vertical section taken upon the line 2 2 of Fig. 1. Fig. 3 is a horizontal section taken on the line 3 3 of Fig. 2. Fig. 4 is a horizontal view through the delivery-pipe and the three-way cock, the same being taken on the line 4 4 of Fig. 2.

Reference now being had to the details of the drawings by letter, A designates a suitable inclosing case, which is divided horizontally by the partition B, so as to form the oil-tank C and the chamber D, in which any desired number of measuring vessels E of different sizes are placed. From the top of each one of these measuring vessels E is an air-escape pipe F, which extends outside of the compartment D, is turned upwardly, and provided with a cock G for controlling the escape of the liquid by controlling the escape of air from the vessel. The upper end of each of these pipes F connects with the single air-pipe H, which has its upper end to project through the side of the tank C immediately under the screw-cap I applied thereto.

Entering from the bottom of the tank C is the supply-pipe J, which has its lower end connected to the outlet-pipe K, in which is placed a three-way cock L, that is operated by the lever M, which projects horizontally outward through the slot N in the front of the compartment D. By moving this lever the cock L can be turned to any position desired.

Extending from the bottom of each measuring vessel E is an outlet-pipe O, which is curved downwardly and upwardly, as is shown in Fig. 2, so as to form air-traps, which are always filled with oil.

When it is desired to draw liquid from the tank C, the outlet-cock L is closed and all of the air-cocks are opened, thus permitting all of the measuring-compartments to be filled. When it is desired to draw liquid from the measuring-compartments, all of the air-cocks are closed excepting the one which is connected with the particular compartment from which liquid is to be drawn. The outlet-cock L is then opened, and the liquid will flow from the compartment supplied with air. The exclusion of air by way of the air-cocks above and the air-trap under the measuring vessels will prevent any liquid from flowing from any of the vessels except the one whose air-cock is open.

The measuring vessels can all be drawn from together or separately by opening all or a single one of the air-cocks, as will be readily understood.

Having thus described our invention, what we claim as new is—

In combination in an oil-measuring tank, the tank partitioned and adapted to receive oil in its upper portion, the measuring vessels located in the compartment beneath the oil-reservoir, the exit-pipe K mounted in an aperture in the wall of the tank, the three-way valve mounted on said exit-pipe, the pipes O communicating between the said measuring-tanks and the three-way valve, the vertically-arranged pipe J communicating between the oil-receptacle and an aperture leading to the pipes O, the turning plug L, the lever M mounted on said plug and extending through a horizontal aperture N, the pipes F having valves G therein, which pipes are connected at their inner ends, the measuring vessels, the vent-pipe H connected to a union into which the pipes F lead, the said pipe H leading to an aperture near the upper end of the oil-tank, and having its upper end opening above the upper wall of the oil-tank, and into the filling-aperture which is covered with a screw-cap, as shown and described.

In testimony whereof we affix our signatures in presence of two witnesses.

CHARLES F. LEWIS.
PERRIN F. LEWIS.

Witnesses:
FRANK E. SESSIONS,
CLINTON M. LEWIS.